United States Patent
Pettit

(10) Patent No.: US 12,425,233 B2
(45) Date of Patent: Sep. 23, 2025

(54) NESTED THRESHOLD SIGNATURES

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 60 days.

(21) Appl. No.: 18/288,555

(22) PCT Filed: Mar. 28, 2022

(86) PCT No.: PCT/EP2022/058085
§ 371 (c)(1),
(2) Date: Oct. 26, 2023

(87) PCT Pub. No.: WO2022/228799
PCT Pub. Date: Nov. 3, 2022

(65) Prior Publication Data
US 2024/0214218 A1    Jun. 27, 2024

(30) Foreign Application Priority Data

Apr. 27, 2021    (GB) ................................ 2105992

(51) Int. Cl.
*H04L 9/32*    (2006.01)
*H04L 9/08*    (2006.01)

(52) U.S. Cl.
CPC ............ *H04L 9/3255* (2013.01); *H04L 9/085* (2013.01); *H04L 9/0869* (2013.01)

(58) Field of Classification Search
CPC ...... H04L 9/3255; H04L 9/085; H04L 9/0869
USPC ........................................................ 713/168
See application file for complete search history.

(56) References Cited

U.S. PATENT DOCUMENTS

| | | |
|---|---|---|
| 7,246,232 B2 | 7/2007 | Dutertre |
| 8,144,874 B2 | 3/2012 | McGough |
| 9,813,244 B1 | 11/2017 | Triandopoulos et al. |
| 9,894,151 B2 | 2/2018 | Dhuse et al. |
| 10,211,981 B2 | 2/2019 | Camenisch et al. |
| 10,511,436 B1 | 12/2019 | Machani |
| 10,764,043 B2 | 9/2020 | Traynor et al. |

(Continued)

FOREIGN PATENT DOCUMENTS

| | | |
|---|---|---|
| JP | 2007124032 A | 5/2007 |
| JP | 2008199278 A | 8/2008 |

(Continued)

OTHER PUBLICATIONS

Combined Search and Examination Report for Application No. GB2009062.7, mailed on Mar. 12, 2021, 10 pages.

(Continued)

*Primary Examiner* — Thanh T Le
(74) *Attorney, Agent, or Firm* — Messner Reeves LLP

(57) ABSTRACT

A computer-implemented method of requiring at least one of a sub-group of a group of participants to contribute to a threshold-optimal signature scheme, wherein the valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares.

17 Claims, 3 Drawing Sheets

(56) References Cited

U.S. PATENT DOCUMENTS

| | | | |
|---|---|---|---|
| 10,903,991 | B1 | 1/2021 | Craige et al. |
| 11,323,267 | B1 | 5/2022 | Griffin et al. |
| 11,563,567 | B2 | 1/2023 | Le Saint |
| 11,973,867 | B2 | 4/2024 | Tysor et al. |
| 12,309,196 | B2 | 5/2025 | Pettit |
| 2002/0116611 | A1 | 8/2002 | Zhou et al. |
| 2003/0009694 | A1 | 1/2003 | Wenocur et al. |
| 2003/0059041 | A1* | 3/2003 | MacKenzie ............ H04L 9/3218 713/180 |
| 2010/0037055 | A1 | 2/2010 | Fazio et al. |
| 2011/0138192 | A1 | 6/2011 | Kocher et al. |
| 2014/0164769 | A1 | 6/2014 | D'Souza |
| 2014/0325309 | A1 | 10/2014 | Resch et al. |
| 2015/0100781 | A1 | 4/2015 | Yann et al. |
| 2015/0288525 | A1 | 10/2015 | Camenisch |
| 2017/0223008 | A1 | 8/2017 | Camenisch |
| 2017/0250972 | A1 | 8/2017 | Ronda |
| 2018/0060248 | A1 | 3/2018 | Liu et al. |
| 2018/0074889 | A1* | 3/2018 | Resch .................... H04L 67/10 |
| 2018/0101697 | A1 | 4/2018 | Rane et al. |
| 2018/0183601 | A1 | 6/2018 | Campagna |
| 2018/0212772 | A1 | 7/2018 | Leavy et al. |
| 2018/0307573 | A1 | 10/2018 | Abraham et al. |
| 2018/0349867 | A1 | 12/2018 | Trieflinger |
| 2019/0007205 | A1 | 1/2019 | Corduan et al. |
| 2019/0280864 | A1 | 9/2019 | Cheng et al. |
| 2019/0370792 | A1 | 12/2019 | Lam |
| 2019/0372759 | A1 | 12/2019 | Rix |
| 2020/0044863 | A1 | 2/2020 | Yadlin et al. |
| 2020/0074450 | A1 | 3/2020 | Fletcher et al. |
| 2020/0145231 | A1 | 5/2020 | Trevethan |
| 2020/0153640 | A1 | 5/2020 | Ranellucci et al. |
| 2020/0169391 | A1* | 5/2020 | Kapp ...................... H04L 9/40 |
| 2020/0213099 | A1 | 7/2020 | Wright |
| 2020/0213113 | A1 | 7/2020 | Savanah et al. |
| 2020/0259638 | A1 | 8/2020 | Carmignani |
| 2020/0259651 | A1* | 8/2020 | Mohassel ............. H04L 9/3218 |
| 2020/0311678 | A1 | 10/2020 | Fletcher et al. |
| 2020/0353167 | A1 | 11/2020 | Vivek et al. |
| 2021/0049600 | A1 | 2/2021 | Spector et al. |
| 2021/0089676 | A1 | 3/2021 | Ford et al. |
| 2021/0359843 | A1* | 11/2021 | Li ......................... H04L 63/065 |
| 2021/0377049 | A1* | 12/2021 | Nix ...................... H04L 9/0877 |
| 2022/0172180 | A1 | 6/2022 | Komiyama |
| 2022/0182235 | A1 | 6/2022 | Tysor et al. |
| 2022/0239509 | A1 | 7/2022 | Jang et al. |
| 2022/0286276 | A1* | 9/2022 | Li ......................... H04L 63/08 |
| 2022/0311623 | A1 | 9/2022 | Tomlinson et al. |
| 2022/0321340 | A1 | 10/2022 | Tsitrin et al. |
| 2023/0361993 | A1* | 11/2023 | Camenisch ........... H04L 9/0825 |

FOREIGN PATENT DOCUMENTS

| | | |
|---|---|---|
| JP | 2013513312 A | 4/2013 |
| JP | 2015194959 A | 11/2015 |
| JP | 2018005089 A | 1/2018 |
| WO | 9937052 A1 | 7/1999 |
| WO | 2015160839 A1 | 10/2015 |
| WO | 2017145010 A1 | 8/2017 |
| WO | 2018189656 A1 | 10/2018 |
| WO | 2019034951 A1 | 2/2019 |
| WO | 2019034986 A1 | 2/2019 |
| WO | 2019158209 A1 | 8/2019 |
| WO | 2019193452 A1 | 10/2019 |
| WO | 2019246206 A1 | 12/2019 |
| WO | 2020084418 A1 | 4/2020 |
| WO | 2021213959 A1 | 10/2021 |
| WO | 2021254702 A1 | 12/2021 |
| WO | 2023072502 A1 | 5/2023 |

OTHER PUBLICATIONS

Combined Search and Examination Report under Sections 17 and 18(3) for Application No. GB2011686.9, mailed on Apr. 22, 2021, 10 pages.

Combined Search and Examination Report under Sections 17 and 18(3) for Application No. GB2017103.9 mailed on Jun. 28, 2021,13 pages.

Fornaro D., "Elliptic Curve Hierarchical Deterministic Private Key Sequences: Bitcoin Standards and BestPractices," Master Thesis, Apr. 19, 2018, retrieved from the URL: https://www.politesi.polimi.it/bitstream/10589/140112/1/2018_04_Fornaro.pdf, 53 pages.

Gennaro R., et al., "Robust Threshold DSS Signatures," International Conference on the Theory and Applications of Cryptographic Techniques, 2001, vol. 164, pp. 54-84.

Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.

International Search Report and Written Opinion for Application No. PCT/EP2021/062941, mailed on Aug. 3, 2021, 14 pages.

International Search Report and Written Opinion for Application No. PCT/EP2021/076686 mailed on Feb. 14, 2022, 17 pages.

International Search Report and Written Opinion issued in International Application No. PCT/EP2021/067673, mailed on Sep. 28, 2021, 13 pages.

Luzio A.D., et al., "Arcula: A Secure Hierarchical Deterministic Wallet for Multi-asset Blockchains," Section 2, Dec. 10, 2019, 33 pages.

Pramanik S., et al., "VPSS: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/MILCOM.2003.1290219, ISBN: 978-0-7803-8140-7.

Combined Search and Examination Report under Sections 17 and 18(3) for Application No. GB2105992.8 mailed on Jan. 17, 2022, 9 pages.

International Search Report and Written Opinion for Application No. PCT/EP2022/058085 mailed on Jul. 26, 2022, 14 pages.

Pettit, Michaella, "Shared Secrets and Threshold Signatures Reference Document", May 1, 2020 (May 1, 2020), pp. 1-23, XP055813628, Retrieved from the Internet: URL: https://nakasendoproject.org/Threshold-Signatures-whitepaper-nchain.pdf [retrieved on Jun. 14, 2021], sections 4 and 5; p. 22.

Damgard Ivan et al: "Fast Threshold ECDSA with Honest Majority", Aug. 23, 2020 (Aug. 23, 2020), Computer Vision—ECCV 2020: 16th European Conference, Glasgow, UK, Aug. 23-28, 2020: Proceedings; Part of the Lecture Notes in Computer Science; ISSN 0302-9743; [Lecture Notes in Computer Science; Lect.Notes Computer], pp. 382-400, XP047591864, ISBN: 978-3-030-58594-5 section 3.

Cachin Christian, "Security and Fault-tolerance in Distributed Systems —Distributed Cryptography", Dec. 31, 2012 (Dec. 31, 2012), XP055903112, Retrieved from the Internet: URL: https://cachin.com/cc/sft12/ distcrypto.pdf, sections 7.2, 7.3, 7.4.

Denis Kolegov et al: "Towards Threshold Key Exchange Protocols", arxiv.org, Cornell University Library, 201 Olin Library Cornell University Ithaca, NY 14853, Dec. 27, 2020 (Dec. 27, 2020), XP081849900, section 2.2.

GB2101590.4 Combined Search and Examination Report dated Jul. 30, 2021,7 pages.

Joonsang Baek et al: "Simple and efficient threshold cryptosystem from the gap diffie-hell man group", GLOBECOM '03. 2003-IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.

PCT/EP2022/050116 International Search Report and Written Opinion dated Apr. 26, 2022, 14 pages.

Combined Search and Examination Report under Sections 17 and 18(3) for Application No. GB2111440.0 mailed on Jan. 25, 2022, 6 pages.

(56) References Cited

OTHER PUBLICATIONS

Combined Search and Examination Report under Sections 17 and 18(3) for Application No. GB2111441.8 mailed on Jan. 25, 2022, 6 pages.
Combined Search Report under Sections 17 for Application No. GB2111442.6 mailed on Jan. 25, 2022, 4 pages.
Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.
Ewa Syta et al: "Keeping Authorities "Honest or Bust" with Decentralized Witness Cosigning", 2016 IEEE Symposium on Security and Privacy (SP), May 1, 2016 (May 1, 2016), pp. 526-545.
Gennaro R., et al, "Fast Multiparty Threshold ECDSA with Fast Trustless Setup," Proceedings of the 2018 ACM SIGSAC Conference on Computerand Communications Security, Oct. 2018, pp. 1179-1194.
Gennaro R., et al., "Robust Threshold DSS Signatures," International Conference on the Theory and Applications of Cryptographic Techniques, 1996, EUROCRYPT '96 pp. 354-371.
International Search Report and Written Opinion for Application No. PCT/EP2022/069246 mailed on Nov. 3, 2022, 15 pages.
International Search Report and Written Opinion for International Application No. PCT/EP2022/076636, mailed Jan. 20, 2023, 12 pages.
Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.
Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.
Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.
Camenisch, Jan, et al. "Short threshold dynamic group signatures." International conference on security and cryptography for networks. Cham: Springer International Publishing, 2020 (Year: 2020).
Boldyreva, Alexandra. "Threshold signatures, multisignatures and blind signatures based on the gap-Diffie-Hellman-group signature scheme." International Workshop on Public Key Cryptography. Berlin, Heidelberg: Springer Berlin Heidelberg, 2002. (Year: 2002).

\* cited by examiner

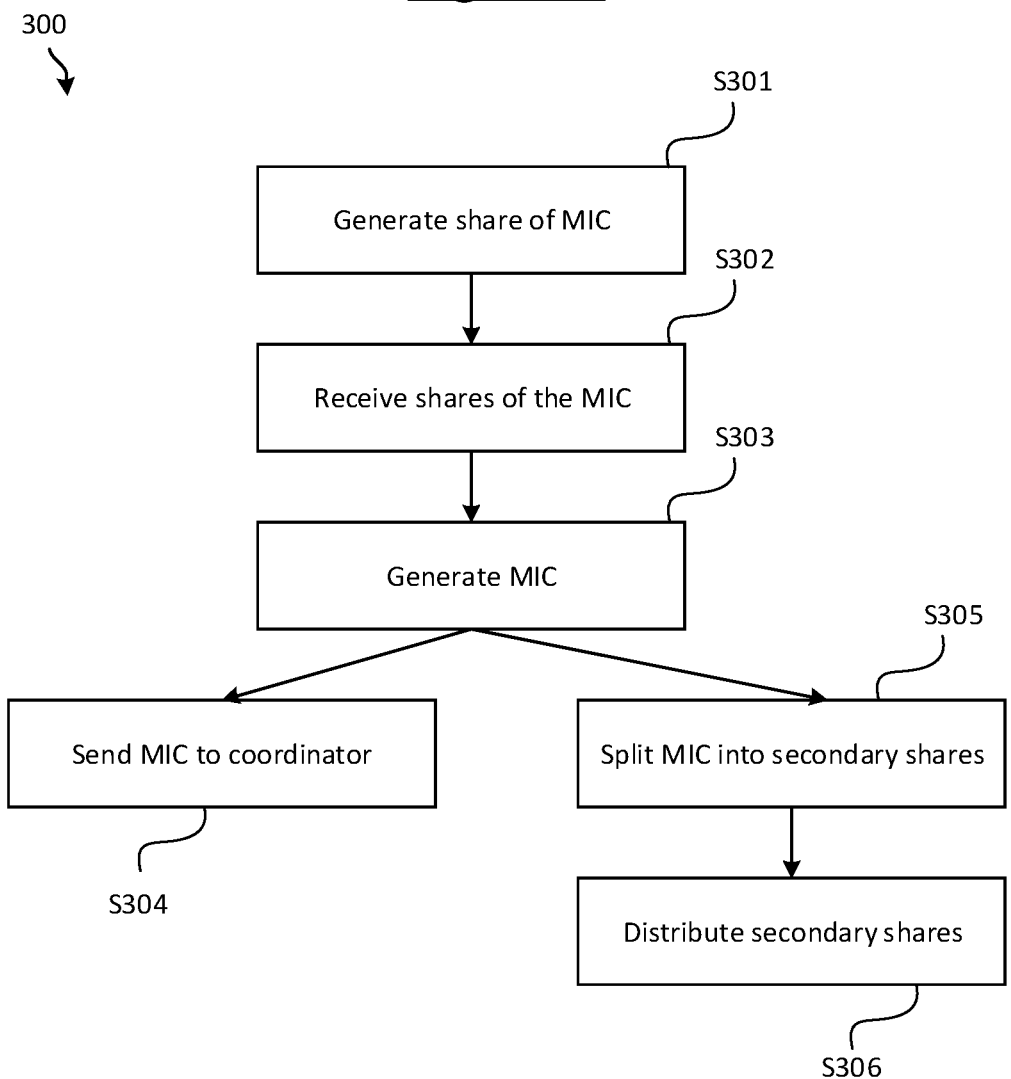

NESTED THRESHOLD SIGNATURES

CROSS REFERENCE TO RELATED APPLICATIONS

This application is the U.S. National Stage of International Application No. PCT/EP2022/058085 filed on Mar. 28, 2022, which claims the benefit of United Kingdom Patent Application No. 2105992.8, filed on Apr. 27, 2021, the contents of which are incorporated herein by reference in their entireties.

TECHNICAL FIELD

The present disclosure relates to threshold digital signatures, and specifically to a method of requiring (i.e. ensuring) that at least one particular participant contributes to a threshold signature scheme to generate a threshold digital signature.

BACKGROUND

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret. A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shares private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

A threshold signature scheme is said to be threshold-optimal if the threshold for generating a valid signature is the same as the threshold of the shared private key.

SUMMARY

A threshold signature scheme requires a threshold number of participants to contribute, i.e. participate, to generate a valid signature. E.g. a threshold number of signature shares must be contributed by a group of participants. There are scenarios where it would be desirable to not only require a threshold number of participants to contribute, but also to require a threshold number of particular participants to contribute. For example, in a 3-of-5 signature scheme, instead of simply requiring any three participants to contribute, it may be desirable to require one of the three participants to be a certain participant, such that unless that participant contributes, the remaining four participants cannot generate a valid signature.

According to one aspect disclosed herein, there is provided a computer-implemented method of requiring at least one of a sub-group of a group of participants to contribute to a threshold-optimal signature scheme, wherein the valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares, and wherein the method comprises, by a first participant belonging to the sub-group: obtaining at least a second threshold number of respective shares of a message-independent component (MIC) of the second signature component, wherein each respective share of the MIC is generated by a respective participant based on a respective ephemeral private key share, a respective private key share and the first signature component, wherein the MIC can only be generated with at least the second threshold number of respective shares of the MIC, wherein a first share of the MIC is generated by the first participant, and wherein the respective shares of the MIC are available only to one or more participants of the sub-group; generating the MIC based on the obtained second threshold number of respective share; and a) making the MIC available to a coordinator for generating the second signature component based on the MIC and the second threshold number of respective shares of a message-dependent component (MDC) of the second signature component, each respective share of the MDC being generated based on a respective ephemeral private key share and a hash of the message; and/or) splitting the MIC into a plurality of secondary MIC shares, wherein a third threshold number of the secondary MIC shares are required to generate the MIC; and distributing one or more respective secondary MIC shares to respective participants of the group for the third threshold number of participants for generating the MIC and making the MIC available to a coordinator for generating the second signature component.

The present scheme is used to require a certain set of participants to be present during the signing protocol of a threshold-optimal signature scheme. In this scheme, a valid signature is made up of two components: a first signature component, sometimes referred to as the r component; and a second signature component, sometimes referred to as the s component. In turn, the s component is based on a message-independent component (MIC), and a message-dependent component (MDC). According to the scheme, a valid signature (specifically a valid second signature component) requires a threshold number of shares of the MDC to be contributed by the threshold number of participants, and also a valid MIC. It has been recognised that by restricting the generation of the MIC to a sub-group of the participants ensures that at least one of the sub-group of participants must contribute to the scheme. If none of the sub-group participates, then a valid MIC cannot be generated, and therefore a valid signature cannot be generated. Conversely, if a valid signature has been generated (which can be checked using the message and public key corresponding to the shared private key), then it follows that at least one of the sub-group must have contributed.

The present scheme creates a "nested threshold" of participants within the threshold signature scheme. That is, within the group of participants that can generate a respective MDC share, there is a sub-group of participants that are capable of generating the MIC, and which are therefore required to generate a valid signature.

Following on from the 3-of-5 example mentioned above, the scheme may be used within a company to generate signatures for important documents, e.g. contracts. Two participants may be managers, and only they have knowledge of the MIC so that there must be at least one manager of the three participants creating a signature. The three participants without the MIC cannot create a signature. On the other hand, if three participants have knowledge of the MIC, there are only two without. In order to create a signature, any subset of three participants will necessarily contain a participant with knowledge of the MIC, and therefore in this example there is no restriction on who can sign.

In some embodiments, once the MIC is calculated by the first participant, it is then split into a plurality of "secondary shares", e.g. using Shamir's secret sharing scheme (SSSS). These secondary shares are distinguished from the shares of the MIC received from the other participants and used by the first participant to generate the MIC. To be clear, shares of the MIC are generated by participants and then used to generate the MIC (e.g. by interpolating over the shares of the MIC). Then, the resulting MIC is split into secondary shares. A threshold number of secondary shares of the MIC are required to reconstruct the MIC. The shares are then distributed to participants. In this case, instead of requiring the first participant to contribute the MIC, the MIC may be reconstructed using a threshold number of secondary shares of the MIC, and then provided to the coordinator. Multiple hierarchies can be created in this way. For example, the owner of a company could distribute the MIC between the CEO, CTO, and CSO so that all three must be present for a signature. They can also split it in a separate SSSS algorithm and give secondary shares to seven different managers, at least five of which must be present instead of three of the C-suite managers.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
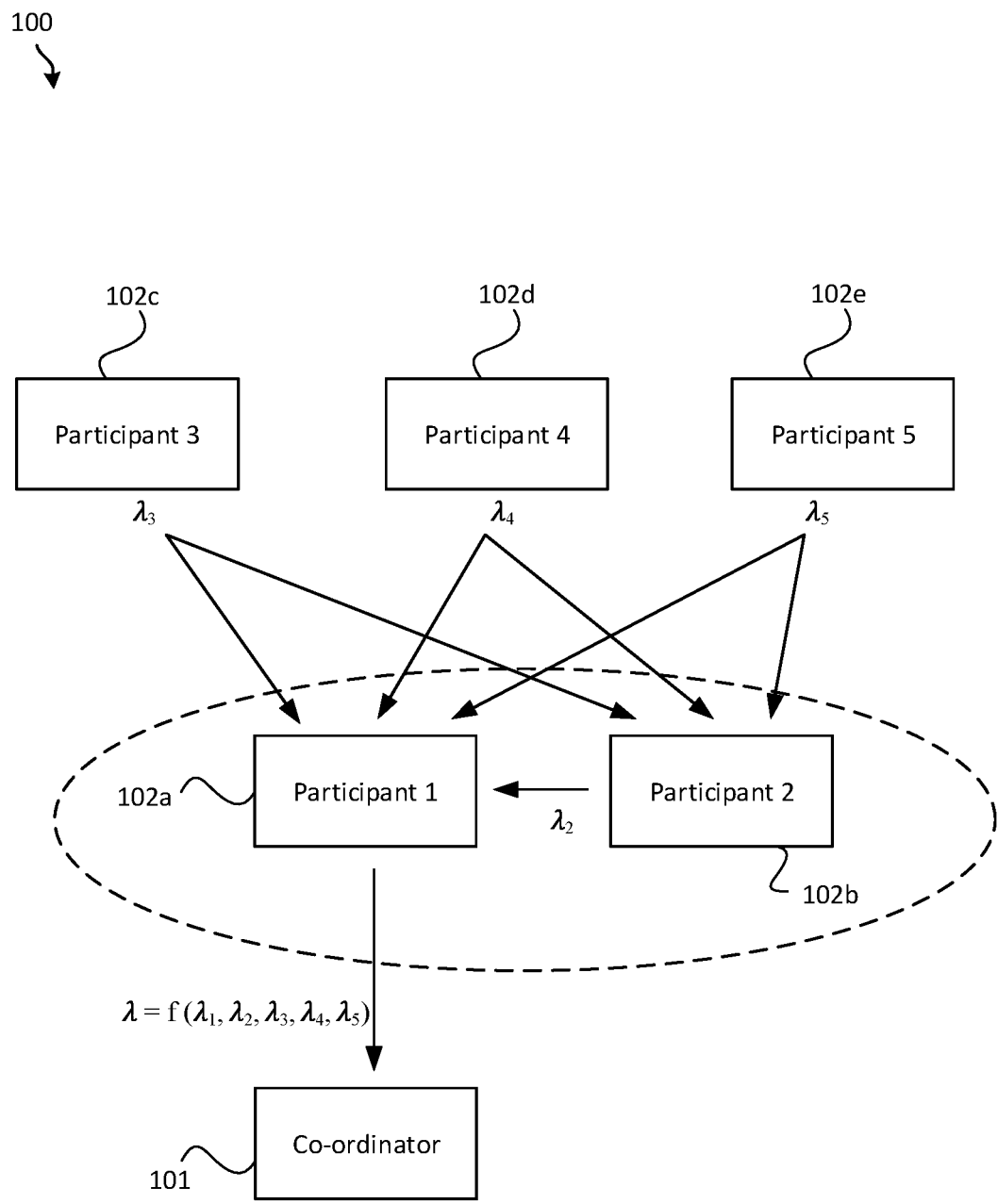
FIG. 1 schematically illustrates an example system for generating a message-independent component of a threshold signature, FIG. 2 schematically illustrates another example system for generating a message-independent component of a threshold signature, FIG. 3 schematically illustrates an example method for generating a message-independent component of a threshold signature.

1. CRYPTOGRAPHIC CONCEPTS Whilst the following examples are described in terms of elliptic curve cryptography, the invention is not limited to any one particular cryptographic scheme and may in general be applied to any cryptographic scheme, e.g. RSA or other public key cryptography schemes.

Elliptic Curve Groups

An elliptic curve E satisfies the equation:

$$y^2 = x^3 + ax + b \bmod p$$

where $a, b \in \mathbb{Z}_p$ and a, b are constants satisfying $4a^3 + 27b^2 \neq 0$. The group over this elliptic curve is defined to be the set of elements (x,y) satisfying this equation along with the point at infinity O, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by·. For a point $G \in E(\mathbb{Z}_p)$ and a scalar $k \in \mathbb{Z}^*_n$, the point k·G is defined to be the point G added to itself k times.

In elliptic curve cryptography, a private key is defined to be a scalar $k \in \mathbb{Z}_n \{0\}$ where $\mathbb{Z}_n\{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key $k \cdot G = (R_x, R_y)$.
4. Calculate $r = R_x$ mod n. If r=0, return to step 2.
5. Calculate the multiplicative inverse of the ephemeral key $k^{-1}$ mod n.
6. Calculate $s = k^{-1}(e+ar)$ mod n. If s=0, return to step 2.
7. The signature on the message msg is (r,s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key $P = a \cdot G$, and corresponding signature (r,s), then one can verify the signature by completing the following steps:

1. Calculate the message digest e=hash(msg), e.g. e=SHA256(SHA256(msg)).
2. Calculate the multiplicative inverse $s^{-1}$ of s modulo n.
3. Calculate $j_1 = es^{-1}$ mod n and $j_2 = rs^{-1}$ mod n.
4. Calculate the point $Q = j_1 \cdot G + j_2 \cdot P$.
5. If Q=O, the point at infinity, the signature is invalid.
6. If Q≠O, then let $Q := (Q_x, Q_y)$, and calculate $u = Q_x$ mod n. If u=r, the signature is valid.

In threshold signature schemes, this private key a is split into key shares that are distributed amongst participants in a threshold scheme group.

Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n\{0\}, \forall j = 0, \ldots, t,$$

where $\in_R$ means a randomly generated element of the set $\mathbb{Z}_n\{0\}$ where $\mathbb{Z}_n\{0\}$ is notation for the set $\{1, \ldots, n-1\}$. Then each participant has a secret polynomial of order t $$f_i(x) = a_{i0} + a_{i1}x + \ldots + a_{it}x^t \text{ mod } n,$$

for i=1, ..., N. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for k=0, ..., t.

5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \forall j = 1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given (t+1) points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{l=1}^{t+1} a_l \prod_{\substack{1 \le j \le (t+1), \\ j \ne l}} (-j)(l-j)^{-1} \right) = a,$$

which is derived from a general formula known as "Lagrange Interpolation".

Public Key Calculation

Given the N zeroth-order private polynomial coefficient public keys $a_{i0} \cdot G$ for i=1, ..., N shared in step 4 of JVRSS, each participant calculates the shared public key P using $$P = a \cdot G = \sum_{j=1}^{N} a_{j0} \cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:
1. Generate the first shared secret a, where participant i's share is given by $a_i$=JVRSS(i) for i=1, ..., N with a threshold of (t+1).
2. Generate the second shared secret b, where participant i's share is given by $b_i$=JVRSS(i), with a threshold of (t+1).
3. Each participant i calculates their own additive share $$v_i = a_i + b_i \bmod n.$$

4. All participants broadcast their additive share $v_i$ to all other participants.
5. Each participant interpolates over at least (t+1) of the shares $v_i$ to calculate $$v = \text{interpolate}(v_1, \ldots, v_{t+1}) = a + b.$$

This method for the addition of shared secrets is denoted by ADDSS(i) for participant i, which results in each participant i knowing v=(a+b).

Product of Shared Secrets

To calculate the product of two shared secrets that are both shared amongst a group of N participants, where each secret polynomial has order t, the group takes the following steps:
1. Generate the first shared secret a, where participant i's share is given by $a_i$=JVRSS(i) for i=1, ..., N. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.
5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu$=ab=PROSS(i) for participant i.

Inverse of a Shared Secret

In order to calculate the inverse of a shared secret a, the following steps are taken:
1. All participants calculate the product of shared secrets PROSS(i), the result of which is $\mu$=ab mod n.
2. Each participant calculates the modular inverse of $\mu$ which results in $$\mu^{-1} = (ab)^{-1} \bmod n.$$

3. Each participant i calculates their own inverse secret share by calculating $$a_i^{-1} = \mu^{-1} b_i.$$

This method for calculating the inverse of shared secrets is denoted by $a_i^{-1}$=INVSS(i) for participant i.

Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, ..., N has a private key share $a_1$ and the corresponding shared public key P=(a·G).

Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1}$=INVSS(i), where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $$r = x \bmod n.$$

3. Each participant i stores (r, $k_i^{-1}$).

Addition of Secrets with Different Thresholds

In the case of addition of secrets of order t and t', the addition of the two secrets requires max(t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

Multiplication of Secrets with Different Thresholds

In the case of multiplication of two secrets with a threshold of t and t', the calculation of the multiplication requires t+t' +1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_p t_p+1$, where p runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using $(ab)a^{-1}$ find b with only t shares of a secret.

Combining the Addition and Multiplication of Shared Secrets in One Step

It is possible to generalise the above to calculate any combination of addition and multiplication in one step. Assume a group of N participants want to calculate the result ab+c, where a, b, c are shared secrets with thresholds $(t_a+1)$, $(t_b+1)$, $(t_c+1)$ respectively. There is a condition which is $\max(t_a+t_b, t_c)<N$, that is, the number of participants of the scheme must be greater than the maximum between the order of the secret c and the order of the result of the multiplication of the secrets a and b.

1. Each participant i calculates their secret shares $a_i$=JVRSS(i), $b_i$=JVRSS(i), $c_i$=JVRSS(i) with thresholds $(t_a+1)$, $(t_b+1)$, $(t_c+1)$ respectively.
2. Each participant i calculates the share $\lambda_i=a_i b_i+c_i$.
3. Each participant i shares the result $\lambda_i$ with the other participants.
4. Each participant interpolates over $\max(t_a+t_b, t_c)+1$ shares to find the result $\lambda=\text{int}(\lambda_1, \ldots, \lambda_i, \ldots)$=ab+c.

This is done in the calculation of a shared signature according to some embodiments below. That is, there is an interpolation over $s_i=k_i^{-1}(e+a_i r)$. This is essentially the case above with $a_i b_i=k_i^{-1} a_i r$ and $c_i=k_i^{-1} e$. In this case $t_a+t_b=2t$ and $t_c=t$, and interpolation is over $\max(t_a+t_b, t_c)+1=2t+1$ shares.

2. NESTED THRESHOLD

FIG. 1 illustrates an example system 100 for generating a message-independent component (MIC) of a threshold signature, and more specifically, of a component of the threshold signature. As shown, the system 100 comprises a plurality (i.e. group) of participants (e.g. users, machines, etc.) 102. A participant may also be referred to as a party or an entity. Each of the participants 102 operates respective computing equipment.

Each of the respective computing equipment of the respective participants 102 comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 are configured to transmit data to one, some or all of the other participants 102 over the internet using a LAN or WAN connection, or via alternative wired or wireless communication means. Unless the context requires otherwise, reference to a participant 102 transmitting data may be understood as transmitting data to other participants 102 individually, e.g. via a secure communication channel between two participants, or broadcasting to the group as a whole, e.g. via email or other means. Again, unless the context requires otherwise, each participant 102 may transmit data in raw form, or in encrypted form. For instance, the data may be encrypted using a public key of a recipient participant before being send to that recipient participant.

In FIG. 1 the group of participants contains five participants. It will be appreciated that this is just for illustrative purposes, and in general the group may contain any number of participants. Also shown in FIG. 1 is a sub-group of the group of participants (enclosed by a dotted line). The sub-group consists of the first and second participants in this example, but again this is merely for illustrative purposes. Note that unless the context requires otherwise, "first", "second", and so on are used merely as distinguishing labels, and do not necessarily imply an order, hierarchy, or the like.

The system 100 also comprises a coordinator 101. The coordinator may be one of the sub-group of participants, e.g. the first participant. Alternatively, the coordinator 101 may be a separate entity. The coordinator operates respective computer equipment as described above with reference to the participants 102.

The coordinator 101 is the party that initiates the signature using a threshold number of signature shares generated by respective participants of a group of participants 102 (described below). That is, the coordinator 101 generates the signature on (i.e. for) a message to be signed. Again, note that generating a signature on a message is taken to mean that a signature is dependent on the message to be signed, or put another way, the signature is a function of the message to be signed. The coordinator 101 may also be the party that sends the signature, and optionally the message, to a third party 103 or otherwise outputs the signature. For instance, the third party 103 may be a certificate authority or other form of authority, or another user. In other examples, the signature may be recorded, e.g. in a database or other document. In some examples, the signature may be made available to the public, e.g. recorded on a website or other publicly accessible medium.

The coordinator 101 may transmit a message to be signed to the participants 102. The message may be transmitted to all of the participants 102, or to a subset of the participants, e.g. the threshold number of participants. The coordinator 101 may transmit the message to one participant who then forwards the message to one, some or all of the other participants. The message may be transmitted over the internet using a LAN or WAN connection, or via alternative wired or wireless communication means. The message may be transmitted to each participant 102 individually, e.g. via a secure communication channel between the coordinator 101 and each participant 102, or broadcast to the group as a whole, e.g. via email or other means. The message may be transmitted in raw form, or in encrypted form. For instance, the message may be hashed one or more times.

One or more of the participants 102 may obtain the message via alternative means, i.e. not from the coordinator 101. For example, the message may be generated by one of the participants 102, or otherwise available, e.g. publicly. One or more participants 102 may receive the message from a third party 103. A participant 102 that obtains the message may transmit the message (in raw or encrypted form) to one or more other participants 102. For instance, the first participant 102 may transmit the message to the other participants.

Each of the group of participants has (e.g. stores in memory) a respective share of a shared private key. The shared private key is in fact a data item Techniques for generating shares of a private key will be familiar to the skilled person. As an illustrative example, each participant may participate in a joint verifiable secret sharing scheme (JVRSS) to generate a respective share of the shared private key. For instance, the first participant 102a may be configured to generate a first private key share $a_1$ of a private key a using the JVRSS technique described above. That is, the first participant 102a may have an index of 1, and generate the first private key share using $a_1$=JVRSS(1) for participant 1, where the private key is denoted by a. Each participant 102 may generate a respective private key share $a_1$. For instance, the second participant 102b may generate a second private key share using $a_2$=JVRSS(2) for participant 2, and so on.

Generating a first private key share $a_1$ using a joint secret share scheme may comprise generating a set of numbers $a_1 j \in_R \mathbb{Z} \{0\}$, $\forall j=0, \ldots, t$, and then generating a first polynomial $f_i(x)=a_{10}+a_{11}x+\ldots+a_{1t}x^t \mod n$, where the set of numbers are the coefficients of the polynomial. Each of the other participants 102 may generate a respective polynomial using a respective set of numbers. For instance, the second participant 102b generates a second polynomial $f_2(x)=a_{20}+a_{21}x+\ldots+a_{2t}x^t \mod n$. The participants 102 then transmit, to each other participant, a value of their respective function evaluated at the index of that other participant. For instance, the first participant 102a evaluates $f_1(2)$ for the second participant 102b and then transmits that value to the second participant 102b, evaluates $f_1(3)$ for the third participant 102c and then transmits that value to the third participant 102c, and so on. The first participant 102a obtains the respective values generated, as a function of the first participant's index, by the other participants 102. The values may be transmitted over the internet, or via other means. The values may be transmitted via respective secure communication channels between respective pairs of the participants. Instead of transmitting directly, one or more participants 102 (e.g. the first participant 102a) may broadcast their respective values. Having obtained at least the threshold number of values from at least the threshold number of participants, the first participant 102a generates the first private key share based on the first value and each other obtained data value, e.g. $f_2(1)$, $f_3(1)$, etc.

The first participant 102a may calculate the corresponding public key a·G based on a set of obfuscated coefficients, where the coefficients are used to generate the respective private key shares $a_i$ of each participant 102. That is, when generating the ephemeral private key share $k_i$, each participant 102 may share the obfuscated coefficients $a_{ij}$·G with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $a_{10}$·G, $a_{11}$·G, $a_{12}$·G, and so on. The public key corresponding to the private key may then be calculated as $$P = a \cdot G = \sum_{j=1}^{N} (a_{j0} \cdot G).$$

It will be appreciated that the corresponding public key need not be generated in order to generate the private key shares $a_i$, and as such this is an optional feature that the participants 102 may implement should they choose to.

Note that the private key shares $a_1$ may be generated using an alternative method, i.e. not using the JVRSS method described above. Methods for generating shares of a private key are, in themselves, known in the art. Similarly, methods for distributing shares of a private key (or other such data) are, in themselves, known in the art. That being said, the private key share $a_i$ may be generated in a number of ways. For instance, a dealer (e.g. a trusted one of the participants 102 or an independent party) may be used to generate and distribute one, some or all of the private key shares $a_i$, e.g. using a Shamir's secret sharing scheme. One such scheme that may be used for generating and distributing private key shares $a_i$ is described in WO2017145010A1.

Regardless of the particular method used to generate the private key shares, each of the first group of participants 102 has (e.g. stores) a respective private key share $a_i$ of the private key a.

Each of the group of participants also has (e.g. stores in memory) a respective share $k_i$ of a shared ephemeral key k. For instance, the first participant has a first ephemeral key share $k_1$, the second participant has a second ephemeral key share $k_2$, and so on. The shares of the shared ephemeral key may be generated using JVRSS, Shamir's secret sharing scheme, or an alternative technique.

As well as a respective private key share and a respective ephemeral key share, each of the group of participants also has (e.g. stores in memory) a first component (a "first signature component") of the threshold signature. This is sometimes known as the r value. For completeness, the second signature component is sometimes known as the s value, and will be described in detail below. The first signature component is based on the public key corresponding to the shared ephemeral key, and more specifically, based on the x-component of the public key corresponding to the shared ephemeral key. For instance, the first signature component may be calculated as r=x mod n, as described above in the Preliminaries section.

Note that instead of in addition to storing their respective share of the shared ephemeral key, some or all of the group of participants may store the inverse share $k_i^{-1}$ of the shared ephemeral key. In some examples, this is calculated as $k_i^{-1}$=INVSS(i).

Returning now to the second signature component. According to the threshold signature scheme, the second signature component is based on a message-independent component (MIC) and a message-dependent component (MDC). A valid signature can only be generated if a threshold number of shares of the MDC are available, where the threshold number is the same as that of the shared private key due to the threshold-optimal nature of the scheme. Therefore at least a threshold number of participants of the group are required to generate a respective share of the MDC, and make their respective share available to the coordinator 101. Each share of the MDC generated by a respective participant is based on at least a respective ephemeral key share and a hash of the message to be signed. Since each of participant has the required data (i.e. ephemeral key share and messaged to be signed, or hash thereof), any of the group of the participants can generate a valid share of the MDC. In some examples, each participant may generate a share of the MDC as $s_i = k_i^{-1}e$, where e is the hashed message. The coordinator may then generate the MDC based on at least the threshold number of shares of the MDC, e.g. by interpolating over the shares the MDC.

Therefore in order to place a restriction on which participant(s) must contribute to, i.e. participant in, the signature scheme, restrictions are placed on which participants can generate the MIC (recall that the MIC is required in order to generate a valid signature). Specifically, only those participants in the sub-group (the "nested threshold") are able to generate the MIC. The following will be described in terms of the first participant 102a generating the MIC, but in general any participant in the sub-group (e.g. the second participant 102b) may generate the MIC in the same way.

The first participant 102a generates a share of the MIC based on the first ephemeral key share $k_1$, the first private key share $a_1$ and the first signature component r. For instance, the first participant may generate a first share of the MIC as $\lambda_1 = k_1^{-1}a_1 r$, where in general each participant (including each participant of the group) may generate a respective share of the MIC as $\lambda_i = k_i^{-1} a_i r$.

Due to the respective shares of the MIC being based on two threshold shares (i.e. the ephemeral key share and the private key share), the MIC requires a second threshold number of shares to be calculated, where the second threshold is different to that of the threshold of the private key share. Therefore the first participant 102a receives respective shares of the MIC from other participants until the first participant 102a has obtained at least the second threshold number of shares of the MIC, including the first share of the MIC generated by the first participant 102a. Then, using the obtained shares of the MIC, the first participant 102a generates the MIC, e.g. by interpolating over at least the second threshold number of shares of the MIC.

A restriction is placed on who can generate the MIC by requiring that only participants of the sub-group are able to receive respective shares of the MIC. That is, the participants of the group that do not belong to the sub-group (i.e. the nested threshold) only send their respective shares of the MIC to participants in the sub-group. In some examples, those participants only send their respective shares to the first participant 102a. This may be the case regardless of whether or not the first participant is the only participant in the sub-group. If the sub-group comprises multiple participants, the first participant 102a may choose to send its share of the MIC (the first share of the MIC) to one or more other participants of the sub-group. It may be preferable that each participant of the sub-group receives all of the shares of the MIC so that each participant in the sub-group can generate the MIC. This acts to prevent a single point of failure.

Note that since the MIC does not require knowledge of the message, the MIC can be pre-calculated. In other words, the MIC can be generated before obtaining the message. Therefore a plurality of different MICs can be pre-calculated, each for use in generating a different respective signature shares $s_1'$ for signing different messages, where the prime (') indicates that it is a different instance of the first signature share.

In some examples, each participant 102 may have (e.g. store in memory) a respective share of a shared blinding key. A blinding key share is used to obfuscate or otherwise "blind" or "hide" another key share or data item. That is, a blinding key share may be applied to a first key share to hide the first key share, such that the resulting key share can be shared without revealing the first key share. In a naive example, the first key share may be 100 and the blinding key share may be 74, allowing the number 174 to be shared. Now, without knowing that the blinding key share is 74, a recipient could not know for sure the first key share. It will be appreciated that in reality the key shares may be much larger numbers. The blinding key shares may be generated using JVRSS or an alternative technique. In these examples, each share of the MIC and each share of the MDC is generated based on a respective share of the shared blinding key. For instance, the first participant 102a may generate the first share of the MIC as $\lambda_1 = k_1^{-1} a_1 r + \beta_1$ and the first share of the MDC as $s_1 = k_1^{31\ 1}e - \beta_1$. To see how the blinding key share works, take the example of the first share of the MDC. If the blinding key share is not used, then when the coordinator receives the first share of the MDC, the coordinator could derive the inverse ephemeral key share, assuming the coordinator has access to the message, or hash thereof. There may be scenarios where this is problematic. Conversely, there may be scenarios where this is not problematic, and therefore the use of a blinding key share is not necessary.

In some embodiments, the first participant 102a sends the MIC to the coordinator 101 for generating the second signature component based on the MDC and the MIC. It is also not excluded that the first participant 102a may perform the role of the coordinator 101, in which case the MIC does not need to be sent to a different entity. A complete valid signature is then generated using the first and second signature components (r,s), e.g. (r, $s = \text{interpolate}(s_1, \ldots, s_{t+1}) + \lambda$), where in this case the first threshold is t+1.

The coordinator 101 may then broadcast or transmit the signature to one or more other entities. Additionally or alternatively, the coordinator may store the signature, and/or record the signature as part of a digital record, e.g. in an email or other document. For example, the message may be part or all of a blockchain transaction. The signature may be included in that blockchain transaction (if the message is only part of the blockchain transaction), or in a different blockchain transaction.

Figure 2:
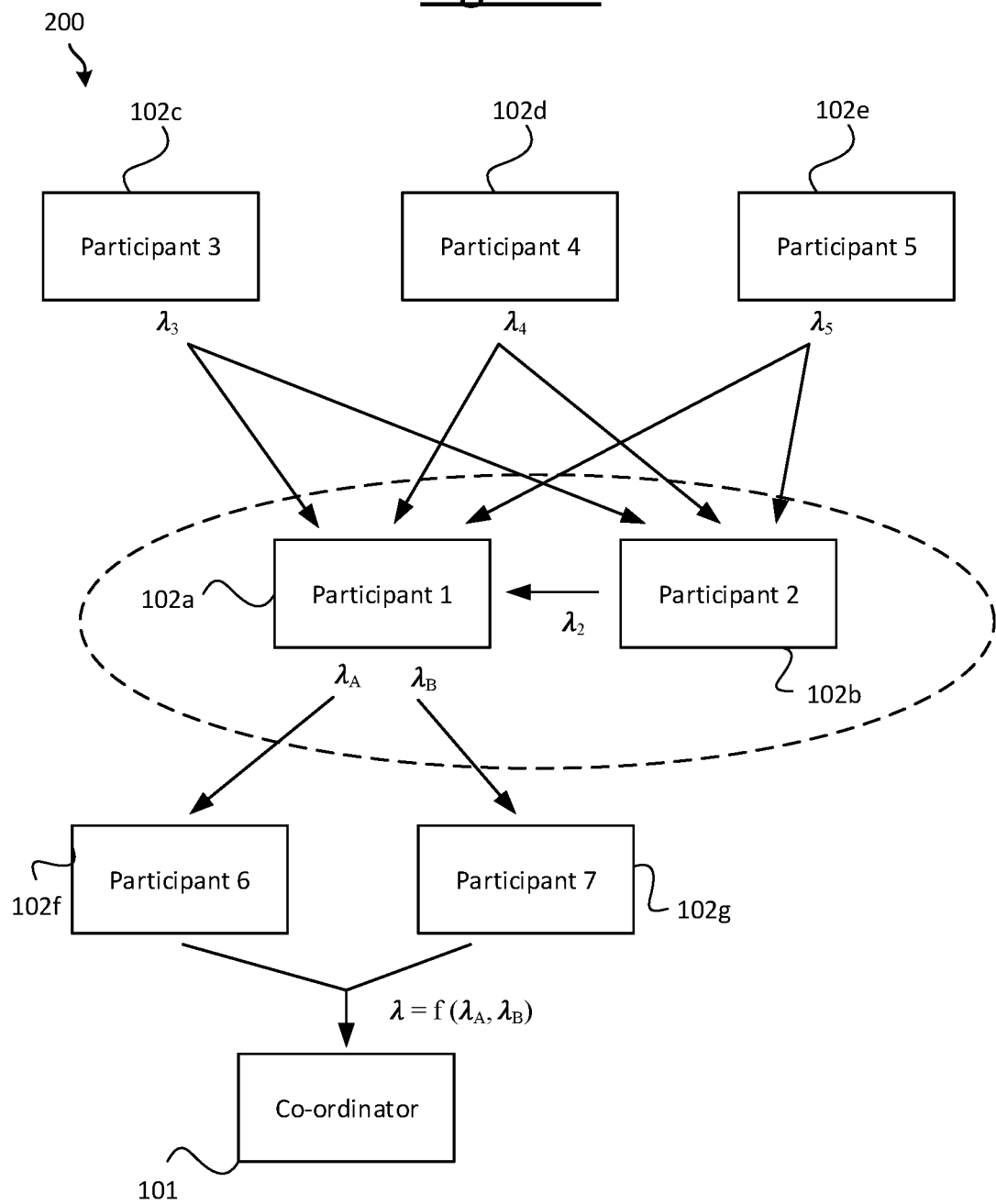

In other embodiments, as illustrated in FIG. 2, instead of sending the MIC to the coordinator 101 (or generating the second signature component), the first participant 102a splits the MIC into a plurality of secondary MIC shares. Note that the secondary MIC shares are different compared to the shares of the MIC generated by the respective participants, which may be referred to as primary MIC shares to differentiate from the secondary MIC shares generated by the first participant 102a. The secondary MIC shares may be split using a (key) splitting scheme such as Shamir's secret sharing scheme. Alternative schemes may be used instead. The MIC is split such that at least a third threshold number of secondary MIC shares are required to reconstruct the MIC.

Having split the MIC into a plurality of secondary MIC shares, the first participant 102a sends some or all of the respective secondary MIC shares to respective participants of a second sub-group. In some examples, the first participant 102a retains at least one secondary MIC share. In some examples, the first participant may delete some or all of the secondary MIC shares, apart from those that the first participant 102a may retain.

In these embodiments, a second sub-group is created, whereby the MIC can be created by a third threshold number of participants in the second sub-group. The second subgroup may be distinct from the first sub-group (as shown in FIG. 2), or one or more participants of the first sub-group may also belong to the second sub-group. At least the third threshold number of participants of the second sub-group can together reconstruct the MIC and make the MIC available to the coordinator 101 for generating the second signature component, as described above. The second sub-group may nominate a leader to gather the required number of secondary MIC shares.

FIG. 3 illustrates an example method 300 for generating a message-independent component of a threshold signature. At step S301, the first participant 102a generates a share of the MIC. At step S301, the first participant 102a receives respective shares of the MIC from respective participants of the group until the first participant 102a has obtained enough shares to generate the MIC. At step S303, the first participant 102a generates the MIC. At step S304, the first participant 102a sends the MIC to the coordinator 101. As another option, at step S305, the first participant 102a splits the MIC into secondary MIC shares. Then, at step S306, the first participant 102a distributes the secondary shares to participants of the second sub-group.

A specific example of the described embodiments is now described with reference to a threshold optimal ECDSA signature scheme disclosed in GB2005953.1, where a threshold of t+1 participants of a group of N≥2t+1 participants are required to create a signature. Optimality is achieved by utilising the fact that a signature can be split into a message dependent component and a message independent component. The message-independent term is precalculated and this results in only requiring the same threshold as the private key number of participants to create a signature, hence achieving optimality. In one version of this scheme, the message independent component may be precalculated and added to the individual signature shares containing the message dependent component (MDC), that are interpolated to create a valid signature. Alternatively, the addition of the MIC may be after interpolation of the signature shares themselves. Explicitly, the MIC is $\lambda = k^{-1}ar + \beta$, which is calculated by interpolating over 2t+1 shares of $\lambda_i = k_i^{-1}a_i r + \beta_i$ and signature shares defined to be $s_i = k_i^{-1}e - \beta_i$. Then the signature is $(r, s=\text{interpolate}(s_1, \ldots, s_{t+1}) + \lambda)$.

This scheme does not describe who knows the MIC, only that it is then used in a signature. In order to create the usual signature scheme, where any t+1 of N can sign, it was assumed that this MIC is shared with all participants. However, this MIC can be shared in specific ways to create a requirement of certain participants to be present during signing. In the following scenarios there will always be at least one participant with knowledge of the MIC since they receive shares and calculate the result λ.

The aim is to create a subset of participants, at least one of which must be present during signing. The size of the subset is referred to as the nested threshold of the scheme, and it is assumed that the size of this subset is at most N−(t+1) as otherwise all subsets will contain one of these required participants. In order to achieve this nested subset of participants, all participants send their share $\lambda_i$ only to the nested subset. Each participant of the subset can then calculate the MIC λ explicitly using interpolation over the shares. Then to create the signature, at least one of the nested subset of participants must be present in the signature protocol and can share the value λ with the coordinator of the signature who is then able to compute the signature using $(r, s=\text{interpolate}(s_1, \ldots, s_{t+1}) + \lambda)$, where $s_i = k_i^{-1}e - \beta_i$.

The size of this nested subgroup may be as low as one participant. However in this case one must be aware that this creates a single point of failure in the scheme, where if this value λ is lost the protocol needs to be repeated to recreate λ.

To illustrate this nested threshold idea take the example of a 3-of-5 scheme used within a company. Two participants may be managers, and only they have knowledge of the MIC so that there must be at least one manager of the 3 participants creating a signature. The three participants without the MIC cannot create a signature. On the other hand, if three participants have knowledge of the MIC, there are only 2 without. In order to create a signature, any subset of three participants will necessarily contain a participant with knowledge of the MIC. Therefore there is no restriction on who can sign which is the same as in the usual method of all participants having knowledge of the MIC.

Multiple nested subsets of participants may be created. As mentioned, there will always be at least one participant with knowledge of the full MIC. Anyone with knowledge of the MIC can use Shamir's Secret Sharing Scheme (SSSS) to split the MIC into a number of shares, which can be distributed among other participants. In this case, either the participants with the full MIC must be present in a signature, or at least the threshold of the SSSS scheme must be present at a lower hierarchy. Multiple hierarchies can be created in this way. This reduces the dependency on the authority by introducing majority to make a joint decision. For example, the owner of a company could distribute the MIC between the CEO, CTO, and CSO so that all three must be present for a signature. They can also split it in a separate SSSS algorithm and give to 7 different managers, 5 of which must be present instead of two of the c-suite managers.

The following describes an example method for generating a signature for a message to illustrate how it can be adapted according to embodiments of the invention to require certain participants to participate. Steps S401 to S408 are performed by each of a threshold number of participants 102 in this example (including the first participant 102a). Step S409 is performed by a coordinator 101, who may also be one of the participants performing steps S401 to S408. It will be appreciated that some of the steps may be omitted or be performed in a different order.

The example method 400 enables the creation of a shared secret of threshold (t+1) in a group of N≥2t+1 participants, where the signing threshold is also (t+1).

Set-Up:

In step S401, each participant 102 calculates a shared private key share $a'_i$ and a corresponding public key. The generation of the private key share $a'_i$ has been described above. At this point, each participant i has a secret key share and public key $(a'_i, P)$, where P is notation for the public key corresponding to the shared private key. The shared private key has a threshold of (t+1).

Pre-Calculation:

In step S402, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $(k_i^{-1}, r)$, with a threshold of (t+1).

In step S403, each participant 102 creates two different shared blinding key shares. For instance, each participant 102 may create two shared secrets so that participant i has shares $a_i$=JVRSS(i) and $\beta_i$=JVRSS(i), each shared secret having a threshold (t+1). Note that in some examples, not all of the shared secrets need to have the same threshold.

In step S404, each participant 102 calculates an intermediary share and broadcasts their intermediary share to the other participants. For instance, each participant i may calculate the intermediary share $\lambda_i = k_i^{-1} a_i' r + \beta_i$. This value has a threshold of $(2t+1)$.

In step S405, the first participant 102a calculates an intermediary value based on at least the intermediary shares. For instance, the first participant 102a may calculate the intermediary value using interpolation over $(2t+1)$ shares $\lambda = \text{interpolate}(\lambda_i, \ldots, \lambda 2_{t+1}) = k^{-1} ar + \beta$.

In step S406, the first participant 102a has knowledge of $(r, k_i^{-1}, \lambda, \beta_i)$ and stores this along with the private key share and corresponding public key $(a_i, P)$.

Note that since a different ephemeral key is used for each signature, multiple ephemeral keys can be set up at one time, that is, steps S402 to S406 can be repeated to create multiple ephemeral keys during pre-calculation and stored for later use. These can be executed at the same time so that there are no additional rounds of communication. Note that preferably, a different value of a and $\beta$ should be used for each signature.

Signature generation:

In order to sign a message msg, at least (t+1) participants must perform steps S407 and S408. In step S407, at least the threshold number of participants 102 obtain a message to be signed and calculate a message digest. For instance, a coordinator 101 may send a request to (t+1) participants to create a signature share on the message msg. Each participant i may calculate the message digest $e = \text{hash}(\text{msg})$. In some examples, this hash function is the double SHA-256 hash function. Alternative hash functions may be used.

In step S408, at least the threshold number of participants 102 calculate a signature share and send it to the coordinator 101. For instance, each participant i may calculate their signature share $s_i = k_i^{-1} e - \beta_i$, and then send this signature share $(r, s_i)$ to the coordinator. Note that the value r may not be sent by all participants.

In step S409, the coordinator 101 calculates the signature. For instance, the coordinator 101 may calculate $s = \text{interpolate}(s_1, \ldots, s_{t+1}) + \lambda = k^{-1} e + k^{-1} ar$, and finally the signature $(r, s)$. This results in the expected signature share since the $\beta$ terms cancel. Similar variations of this protocol can be made as above describing when the $(ka)^{-1}$ and r is included in the calculation.

Note that the thresholds of the secrets may be different. That is the threshold of a, k, a, $\beta$ themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that the present invention may be applied to any threshold signature scheme (whether optimal or non-optimal) and is not limited to the example of FIG. 4 described above.

In general, embodiments of the present invention can be used to generate a signature on any message. As a particular example use case, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:

Locking script=OP_DUP OP_HASH160<Public KeyHash>OP_EQUAL OP_CHECKSIG Unlocking script=<Signature><Public Key>Referring to the above described embodiments, the <Public Key> may be equated to P=a G, and the <Signature>comprises the threshold signature s, where the previous transaction is the message to be signed. Note that as stated above, ECDSA signatures are in the form (r,s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the Board of a company. Voting matters of the company may require a majority of the Board (i.e. at least three participants) to agree on the particular vote. The Board may use the described signature generation method to prove that at least three Board members agreed to vote in favour of a particular outcome. In this example, the threshold of the signature generation scheme is three. That is, at least three of the Board members must provide a respective signature share in order for the co-ordinator to successfully generate a signature. If a signature is generated successfully, at least the threshold number (i.e. three) of Board members must have agreed to vote in favour of that outcome. Thus the successful generation of a signature acts as a record of the vote and proves that a majority of the Board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key.

One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

3. CONCLUSION

It will be appreciated that the above embodiments have been described by way of example only. More generally there may be provided a method, apparatus or program in accordance with any one or more of the following Statements.

Statement 1. A computer-implemented method of requiring at least one of a sub-group of a group of participants to contribute to a threshold-optimal signature scheme, wherein the valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares, and wherein the method comprises, by a first participant belonging to the sub-group:

obtaining at least a second threshold number of respective shares of a message-independent component (MIC) of the second signature component, wherein each respective share of the MIC is generated by a respective participant based on a respective ephemeral private key share, a respective private key share and the first signature component, wherein the MIC can only be generated with at least the second threshold number of respective shares of the MIC, wherein a first share of the MIC is generated by the first participant, and wherein the respective shares of the MIC are available only to one or more participants of the sub-group;

generating the MIC based on the obtained second threshold number of respective share; and a) making the MIC available to a coordinator for generating the second signature component based on the MIC and the second threshold number of respective shares of a message-dependent component (MDC) of the second signature component, each respective share of the MDC being generated based on a respective ephemeral private key share and a hash of the message; and/or b) splitting the MIC into a plurality of secondary MIC shares, wherein a third threshold number of the secondary MIC shares are required to generate the MIC; and distributing one or more respective secondary MIC shares to respective participants of the group for the third threshold number of participants for generating the MIC and making the MIC available to a coordinator for generating the second signature component.

Statement 2. The method of statement 1, comprising:
generating a first share of the MDC; and
making the first share of the MDC available to the coordinator for generating the second component of the signature.

Statement 3. The method of statement 1 or statement 2, wherein the first participant comprises the coordinator, and wherein the method comprises generating the second signature component.

Statement 4. The method of statement 1 or statement 2, wherein the coordinator is a different one of the participants or a third party.

Statement 5. The method of any preceding statement, wherein each participant has a respective blinding key share of a blinding key, wherein each respective share of the MIC is generated based on the respective blinding key share, and wherein each respective share of the MDC is based on the respective blinding key share.

Statement 6. The method of any preceding statement, wherein the sub-group comprises a plurality of participants, and wherein a) comprises making the first share of the MIC available to one, some or all of the other participants in the sub-group.

Statement 7. The method of any preceding statement, wherein the sub-group comprises a plurality of participants, and wherein each participant in the sub-group receives each respective share of the MIC.

Statement 8. The method of any of statements 1 to 5, wherein the sub-group consists of the first participant.

Statement 9. The method of any preceding statement, wherein the message comprises at least part of a blockchain transaction.

Statement 10. The method of any preceding statement, wherein a size of the group is $N \geq 2t+1$ and a size of the sub-group is $N-(t+1)$, wherein t is the order of a polynomial used to derive the respective private key share of each participant, wherein $2t+1$ is the first threshold number and $t+1$ is the second threshold number.

Statement 11. The method of any preceding statement, wherein each participant generates the respective private key share, and the respective ephemeral private key share using a joint verifiable random secret sharing scheme (JVRSS).

Statement 12. The method of statement 5 or any statement dependent thereon, wherein each participant generates the respective blinding key share using JVRSS.

Statement 13. The method of any preceding statement, wherein the method comprises said splitting of the MIC into the plurality of secondary MIC shares, and wherein said splitting of the MIC is performed using Shamir's secret sharing scheme.

Statement 14. The method of any preceding statement, wherein the signature is an elliptic curve digital signature algorithm (ECDSA) signature.

Statement 15. The method of statement 5 and statement 14, wherein each share of the MIC is generated as $\lambda_i = k_i^{-1} a_i r + \beta_i$, where $k_i$ is a respective ephemeral private key share, $a_i$ is a respective private key share, $\beta_i$ is a respective blinding key share, and r is the first signature component, and wherein each share of the MDC is generated as $s_i = k_i^{-1} e - \beta_i$, where r is the hash of the message.

Statement 16. Computer equipment comprising:
memory comprising one or more memory units; and
processing apparatus comprising one or more processing units, wherein the memory stores code arranged to run on the processing apparatus, the code being configured so as when on the processing apparatus to perform the method of any preceding statement.

Statement 17. A computer program embodied on computer-readable storage and configured so as, when run on computer equipment, to perform the method of any of statements 1 to 15.

According to another aspect disclosed herein, there may be provided a method comprising the actions of the first participant and the coordinator.

According to another aspect disclosed herein, there may be provided a system comprising the computer equipment of the first participant and the coordinator.

According to another aspect disclosed herein, there may be provided a method comprising the actions of each participant.

According to another aspect disclosed herein, there may be provided a system comprising the computer equipment of each participant.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of requiring at least one of a sub-group of a group of participants to contribute to a threshold-optimal signature scheme, wherein a valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares, and wherein the method comprises, by a first participant belonging to the sub-group:
   obtaining at least a second threshold number of respective shares of a message-independent component (MIC) of the second signature component, wherein each respective share of the MIC is generated by a respective participant based on a respective ephemeral private key share, a respective private key share and the first signature component, wherein the MIC can only be generated with at least the second threshold number of respective shares of the MIC, wherein a first share of the MIC is generated by the first participant, and wherein the respective shares of the MIC are available only to one or more participants of the sub-group;
   generating the MIC based on the obtained second threshold number of respective shares; and
   a) making the MIC available to a coordinator for generating the second signature component based on the MIC and the second threshold number of respective shares of a message-dependent component (MDC) of the second signature component, each respective share of the MDC being generated based on a respective ephemeral private key share and a hash of a message to be signed by the valid signature; and/or
   b) splitting the MIC into a plurality of secondary MIC shares, wherein a third threshold number of the secondary MIC shares are required to generate the MIC; and distributing one or more respective secondary MIC shares to respective participants of the group for the third threshold number of participants for generating the MIC and making the MIC available to a coordinator for generating the second signature component.

2. The method of claim 1, comprising:
generating a first share of the MDC; and
making the first share of the MDC available to the coordinator for generating the second component of the signature.

3. The method of claim 1, wherein the first participant comprises the coordinator, and wherein the method comprises generating the second signature component.

4. The method of claim 1, wherein the coordinator is a different one of the participants or a third party.

5. The method of claim 1, wherein each participant has a respective blinding key share of a blinding key, wherein each respective share of the MIC is generated based on the respective blinding key share, and wherein each respective share of the MDC is based on the respective blinding key share.

6. The method of claim 5, wherein the signature is an elliptic curve digital signature algorithm (ECDSA) signature, and wherein each share of the MIC is generated as $\lambda_i = k_i^{-1} a_i r + \beta_i$, where $k_i$ is a respective ephemeral private key share, $a_i$ is a respective private key share, $\beta_i$ is a respective blinding key share, and r is the first signature component, and wherein each share of the MDC is generated as $s_i = k_i^{-1} e - \beta_i$, where r is the hash of the message.

7. The method of claim 1, wherein the sub-group comprises a plurality of participants, and wherein a) comprises making the first share of the MIC available to one, some or all of the other participants in the sub-group.

8. The method of claim 1, wherein the sub-group comprises a plurality of participants, and wherein each participant in the sub-group receives each respective share of the MIC from the other participants in the group of participants.

9. The method of claim 1, wherein the sub-group consists of the first participant.

10. The method of claim 1, wherein the message comprises at least part of a blockchain transaction.

11. The method of claim 1, wherein a size of the group is $N \geq 2t+1$ and a size of the sub-group is $N-(t+1)$, wherein t is the order of a polynomial used to derive the respective private key share of each participant, wherein $2t+1$ is the first threshold number and $t+1$ is the second threshold number.

12. The method of claim 1, wherein each participant generates the respective private key share, and the respective ephemeral private key share using a joint verifiable random secret sharing scheme (JVRSS).

13. The method of claim 5, wherein each participant generates the respective blinding key share using JVRSS.

14. The method of claim 1, wherein the method comprises said splitting of the MIC into the plurality of secondary MIC shares, and wherein said splitting of the MIC is performed using Shamir's secret sharing scheme.

15. The method of claim 1, wherein the signature is an elliptic curve digital signature algorithm (ECDSA) signature.

16. Computer equipment, comprising:
memory comprising one or more memory units; and
processing apparatus comprising one or more processing units, wherein the memory stores code arranged to run on the processing apparatus, the code being configured so as when on the processing apparatus to perform a method of requiring at least one of a sub-group of a group of participants to contribute to a threshold-optimal signature scheme, wherein a valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares, and wherein the method comprises, by a first participant belonging to the sub-group:
   obtaining at least a second threshold number of respective shares of a message- independent component (MIC) of the second signature component, wherein each respective share of the MIC is generated by a respective participant based on a respective ephemeral private key share, a respective private key share and the first signature component, wherein the MIC can only be generated with at least the second threshold number of respective shares of the MIC, wherein a first share of the MIC is generated by the first participant, and wherein the respective shares of the MIC are available only to one or more participants of the sub-group;

generating the MIC based on the obtained second threshold number of respective shares; and a) making the MIC available to a coordinator for generating the second signature component based on the MIC and the second threshold number of respective shares of a message-dependent component (MDC) of the second signature component, each respective share of the MDC being generated based on a respective ephemeral private key share and a hash of a message to be signed by the valid signature; and/or b) splitting the MIC into a plurality of secondary MIC shares, wherein a third threshold number of the secondary MIC shares are required to generate the MIC; and distributing one or more respective secondary MIC shares to respective participants of the group for the third threshold number of participants for generating the MIC and making the MIC available to a coordinator for generating the second signature component.

17. A non-transitory computer readable medium, comprising a computer program configured so as, when run on computer equipment, the computer equipment performs a method of requiring at least one of a sub-group of a group of participants to contribute to a threshold-optimal signature scheme, wherein a valid signature comprises a first signature component and a second signature component, wherein each participant has a respective private key share of a shared private key, a respective ephemeral private key share of a shared ephemeral private key, and the first signature component, wherein the shared private key can only be generated with at least a first threshold number of respective private key shares, and wherein the method comprises, by a first participant belonging to the sub-group:

obtaining at least a second threshold number of respective shares of a message-independent component (MIC) of the second signature component, wherein each respective share of the MIC is generated by a respective participant based on a respective ephemeral private key share, a respective private key share and the first signature component, wherein the MIC can only be generated with at least the second threshold number of respective shares of the MIC, wherein a first share of the MIC is generated by the first participant, and wherein the respective shares of the MIC are available only to one or more participants of the sub-group;

generating the MIC based on the obtained second threshold number of respective shares; and a) making the MIC available to a coordinator for generating the second signature component based on the MIC and the second threshold number of respective shares of a message-dependent component (MDC) of the second signature component, each respective share of the MDC being generated based on a respective ephemeral private key share and a hash of a message to be signed by the valid signature; and/or b) splitting the MIC into a plurality of secondary MIC shares, wherein a third threshold number of the secondary MIC shares are required to generate the MIC; and distributing one or more respective secondary MIC shares to respective participants of the group for the third threshold number of participants for generating the MIC and making the MIC available to a coordinator for generating the second signature component.

* * * * *